(12) United States Patent
Sonoda et al.

(10) Patent No.: US 8,049,799 B2
(45) Date of Patent: Nov. 1, 2011

(54) METHOD OF DRIVING SOLID-STATE IMAGING APPARATUS

(75) Inventors: Kazuhiro Sonoda, Yokohama (JP); Kazuo Yamazaki, Ebina (JP); Shintaro Takenaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 12/420,422

(22) Filed: Apr. 8, 2009

(65) Prior Publication Data

US 2009/0256936 A1    Oct. 15, 2009

(30) Foreign Application Priority Data

Apr. 11, 2008   (JP) .................................. 2008-103556

(51) Int. Cl.
*H04N 5/335* (2006.01)
(52) U.S. Cl. ........................................ 348/294; 348/323
(58) Field of Classification Search .................. 348/300, 348/301, 303, 307
See application file for complete search history.

(56) References Cited

U.S. PATENT DOCUMENTS

| | | | | |
|---|---|---|---|---|
| 6,115,066 A * | 9/2000 | Gowda et al. | | 348/308 |
| 6,512,543 B1 * | 1/2003 | Kuroda et al. | | 348/302 |
| 6,573,936 B2 * | 6/2003 | Morris et al. | | 348/294 |
| 6,946,637 B2 * | 9/2005 | Kochi et al. | | 250/208.1 |
| 6,967,685 B2 * | 11/2005 | Hamasaki | | 348/314 |
| 7,342,212 B2 * | 3/2008 | Mentzer et al. | | 250/208.1 |
| 7,423,790 B2 | 9/2008 | Kochi et al. | | 358/513 |
| 2002/0154347 A1 | 10/2002 | Funakoshi et al. | | 358/513 |
| 2005/0195304 A1 | 9/2005 | Nitta et al. | | 348/308 |
| 2007/0076109 A1 * | 4/2007 | Krymski | | 348/300 |
| 2008/0024634 A1 | 1/2008 | Takenaka | | 348/307 |
| 2008/0225145 A1 | 9/2008 | Sonoda | | 348/294 |
| 2008/0291290 A1 | 11/2008 | Sonoda et al. | | 348/222.1 |
| 2009/0219424 A1 | 9/2009 | Sonoda et al. | | 348/302 |
| 2009/0244328 A1 | 10/2009 | Yamashita | | 348/241 |

FOREIGN PATENT DOCUMENTS

| | | | |
|---|---|---|---|
| JP | 2002-320235 A | 10/2002 | |
| JP | 2005-278135 A | 10/2005 | |
| JP | 2006-025189 A | 1/2006 | |
| JP | 2007-336374 A | 12/2007 | |

* cited by examiner

*Primary Examiner* — Luong Nguyen
(74) *Attorney, Agent, or Firm* — Fitzpatrick, Cella, Harper & Scinto

(57) ABSTRACT

When a horizontal skipping operation is performed in a solid-state imaging apparatus that includes an A/D converting circuit in each column and that applies an arithmetic operation process to a digitalized signal and an arithmetic operation is performed with signals held by a plurality of register circuits, A/D converters and register circuits in columns in which signals are skipped, or not read out, are not involved in the operations. A more consideration is needed in terms of the use efficiency of circuits. A unit for connecting a register circuit of a certain column and a register circuit of a different column is arranged.

13 Claims, 11 Drawing Sheets

METHOD OF DRIVING SOLID-STATE IMAGING APPARATUS

BACKGROUND OF THE INVENTION

1. Field of the Invention

The present invention relates to a solid-state imaging apparatus, and particularly, to a solid-state imaging apparatus and a method of driving the solid-state imaging apparatus including an A/D converting circuit in each column and characterized by applying an arithmetic operation process to obtained plurality of digital signals.

2. Description of the Related Art

So-called horizontal skipping read out (hereinafter synonymous with horizontal skipping operation) is known as an application that requires high-speed operations of moving images in conventional solid-state imaging apparatuses, in which among the pixels arranged in a matrix, an analog electric signal converted from an incident light is read out every other columns in each pixel, for example.

Japanese Patent Application Laid-Open No. 2006-025189 discloses a technique for arranging an A/D converting circuit in each column of pixels and applying an arithmetic operation process to a digitalized signal. Specifically, an image sensor is disclosed in which two register circuits are arranged in each pixel column, two different signal levels of the same pixel are stored, and then an arithmetic operation is performed to the difference of the two in a digital domain.

When a horizontal skipping operation is performed in a circuit configuration as disclosed in Japanese Patent Application Laid-Open No. 2006-025189 and an arithmetic operation is performed with signals held in a plurality of register circuits, A/D converters and register circuits in columns that are skipped, or not read out, are not involved in the operations. A more consideration is needed in terms of the use efficiency of the circuits.

SUMMARY OF THE INVENTION

To solve the problem, the present invention provides a method of driving a solid-state imaging apparatus comprising: a plurality of pixels, arranged in a matrix, each converting an incident light into an analog electric signal and outputting the analog signal; A/D converters arranged each corresponding to each column of the plurality of pixels, for converting the analog electric signal into a digital signal and for outputting the digital signal from an output terminal of the A/D converter; register circuits each arranged correspondingly to each column of the pixels; and a connecting unit for (1) connecting the output terminal of the A/D converter arranged correspondingly to one column of the pixels to an input terminal of the register circuit arranged correspondingly to the one column of the pixels, for (2) connecting the output terminal of the A/D converter to the input terminal of the register circuit arranged correspondingly to the other column of the pixels, or for (3) connecting an output terminal of the register circuit arranged corresponding to the one column of the pixels to the input terminal of the register circuit arranged corresponding to the other column of the pixels, wherein the register circuit arranged corresponding to the one column of the pixels holds the digital signal received by the input terminal thereof from the output terminal of the A/D converter or from the output terminal of the register circuit arranged corresponding to the other column of the pixels, and wherein the method comprises steps of: executing an operation of outputting from the register circuit the digital signal based on the pixel in a first row of the matrix; and executing an operation of inputting into or converting by the A/D converter the analog electric signal from the pixel in a second row of the matrix, independently from the step of executing the operation of outputting.

According to the present invention, when performing a horizontal skipping operation and performing an arithmetic operation using digital signals held by a plurality of register circuits, the number of register circuits not involved in the operations can be reduced, and the use efficiency of the circuits can be improved.

Further features of the present invention will become apparent from the following description of exemplary embodiments with reference to the attached drawings.

DESCRIPTION OF THE EMBODIMENTS

Embodiments of the present invention will now be described.

First Embodiment

A circuit configuration of a solid-state imaging apparatus according to an embodiment of the present invention will be described first. Next, in a horizontal skipping operation, an operation for transferring digital signals held in register circuits in a column subjected to reading is transferred to register circuits of a column not subjected to the reading and for applying an arithmetic operation process to a plurality of digital signals from a pixel of a different row in the same column will be described.

Figure 1:
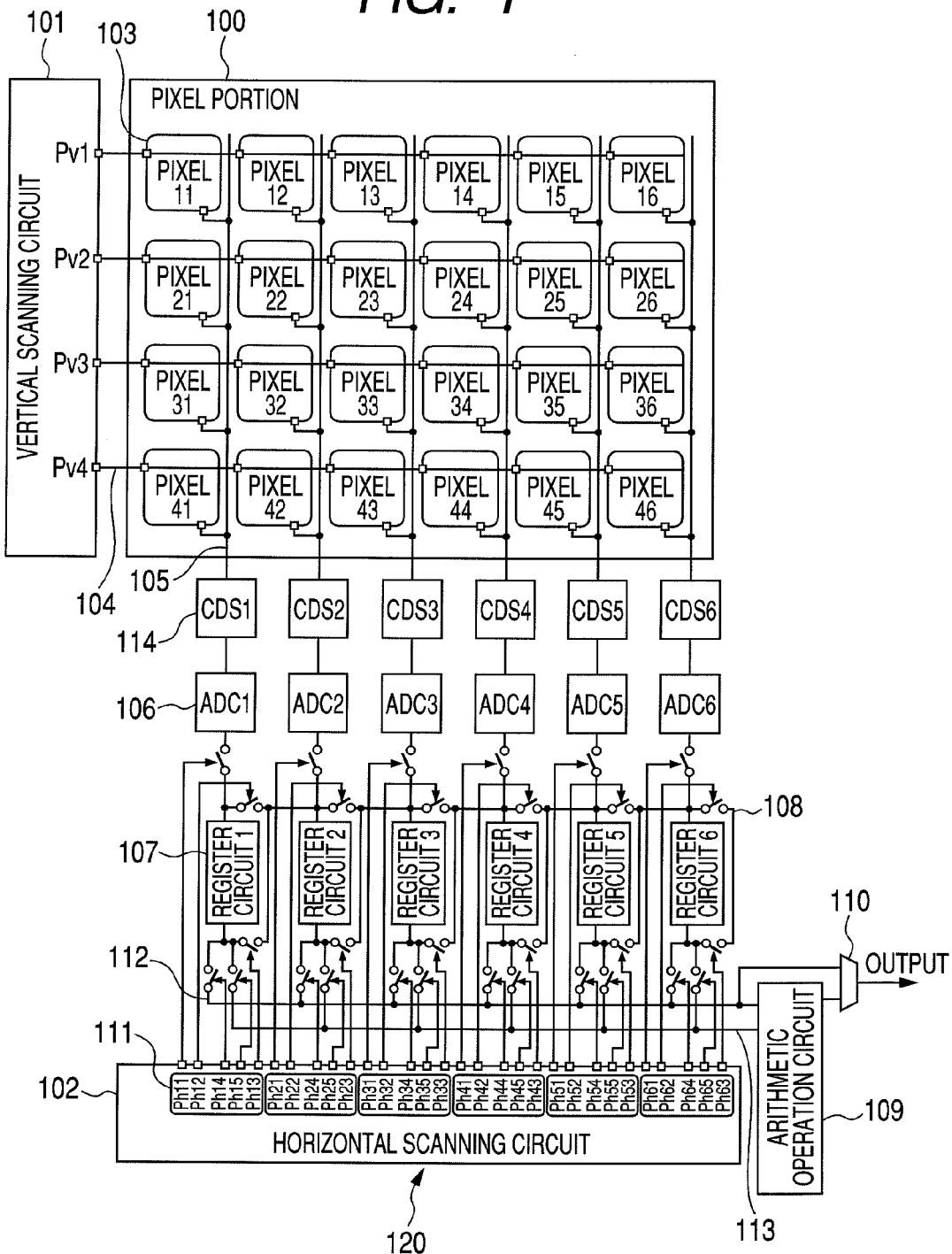
FIG. 1 is a block diagram of a solid-state imaging apparatus according to embodiments of the present invention.

FIG. 1 is a block diagram of a solid-state imaging apparatus according to an embodiment of the present invention. A pixel portion 100 includes photoelectric conversion elements each converting an incident light to a charge, and pixels 103 that output analog electric signals are arranged in a matrix, with six pixels horizontally and four pixels vertically. The pixels 103 constituting one row are commonly connected to a vertical scanning circuit 101 through a row selection line 104, and six pixels connected to the selected row selection line 104 are simultaneously selected. Pixels of a first row to a fourth row are sequentially selected by sequentially making the row selection signals high from Pv1 to Pv4.

Analog electrical signals output from the pixels of a row selected by the row selection line 104 are input to a CDS (Correlated Double Sampling) circuit 114 arranged for each column through a vertical output line 105 to which the pixels of one column are commonly connected. The CDS circuit 114 executes a difference process between a noise level and a signal level included in an analog electric signal to cancel noise. Although the vertical output line 105 is directly connected to the CDS circuit in FIG. 1, an amplifier for amplifying the analog electrical signals from the pixels may be connected between the pixel portion 100 and the CDS 114 to reduce the influence by noise components superimposed on the analog electrical signals. The noise-cancelled analog electrical signal of each of the columns are input to an A/D converter 106 arranged in each column. The analog electrical signal input to the ADC is converted to a digital signal. The digital signal is output from an output terminal of the A/D converter, and a register circuit 107 arranged in each column of the pixels receives the digital signal from an input terminal and holds the digital signal.

The horizontal scanning circuit 102 arbitrarily selects the register circuit 107 to output the digital signals held in the register circuit 107 to a horizontal output line from the output terminal of the register circuit 107. For example, when the horizontal scanning circuit 102 changes the column selection signals to high level in the order of Ph14, Ph24, ..., the digital signals held in the register circuits are sequentially output to the horizontal output line 112 from the register circuits 1 to 6. The digital signals output to the horizontal output line 112 are output through the selector 110.

The horizontal scanning circuit 102 changes the column selection signals to high level in the order of Ph15, Ph25, ... to sequentially output the digital signals held in the register circuits 1 to 6 to the horizontal output line 113. After the digital signals are simultaneously output to the horizontal output lines 112 and 113, the arithmetic operation circuit 109 as an arithmetic operation apparatus connected with the horizontal output lines 112 and 113 in parallel executes an arithmetic operation process such as addition, subtraction, and averaging based on the digital signals. The arithmetic operation result is output through the selector 110. Although two horizontal output lines are connected to the arithmetic operation circuit 109 herein, three or more horizontal output lines may be connected, so that the arithmetic operation is applied to three or more digital signals.

In the present embodiment, the selector 110 selects and outputs a signal obtained by applying an arithmetic operation process to two digital signals read out to the horizontal output lines 112 and 113, and a digital signal read out to the horizontal output line 112 and not subjected to the arithmetic operation process.

Although horizontal six pixel columns form two blocks of three pixel columns in the present embodiment, the effects of the present invention are the same when pixel columns per block are increased or when the columns are divided into three or more blocks.

A more specific configuration example of the pixels of the solid-state imaging apparatus and the CDS circuit according to FIG. 1 will be illustrated in FIG. 2, and the operation will be described using FIG. 3.

A pixel includes a photodiode PD as a photoelectric conversion unit for accumulating the charge from the incident light. The charge accumulated in the photodiode PD is transferred to a floating diffusion portion FD through a transferring switch TX. The floating diffusion portion FD is the same node as the input terminal of the amplification unit SF, and an electric potential of the node is reset based on a power supply Vcc when a reset switch RES is turned on. The amplification unit SF is a MOS transistor herein, and the gate terminal serves as the input terminal. When a selection switch SEL is turned on, the MOS transistor of the amplification unit SF and a constant current source I form a source follower circuit, and an electric potential corresponding to the electric potential of the input terminal appears on a vertical output line VL. Signals Ptx, Pres, and Psel supplied to the transferring switch TX, the reset switch RES, and the selection switch SEL are supplied from, for example, the vertical scanning circuit, and the signal Psel corresponds to the row selection signal Pvn (n is a natural number) in FIG. 1. The transferring switch TX, the reset switch RES, and the selection switch SEL may be constituted by MOS transistors as in the amplification unit SF.

The CDS circuit includes a clamp capacity C0 and an operational amplifier AMP, and a feedback capacity Cf and a switch Pc0r are arranged in parallel between the inverting input terminal and the output terminal of the operational amplifier.

Figure 3:
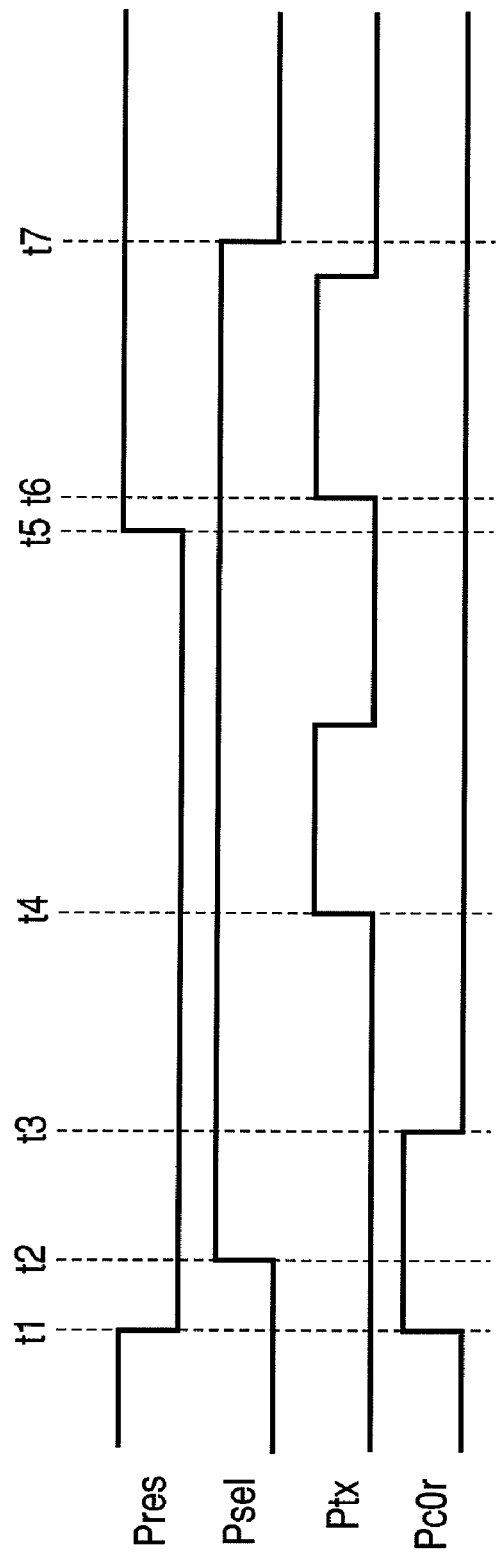
FIG. 3 is a timing chart of an operation of a pixel and a CDS circuit according to the embodiments of the present invention.

FIG. 3 is a timing diagram of an operation in a period including a horizontal blanking period and an A/D conversion period described below, and the charge generated from the incident light is accumulated on the photodiode PD before the operation described here.

Resetting of the floating diffusion portion is finished as the signal Pres is changed from high level to low level in a time t1. The signal Pc0r changes to high level, and the inverting input terminal and the output terminal of the operational amplifier AMP are shorted. As a result, the voltage held in the feedback capacity Cf is reset.

When the signal Psel becomes high level in the following time t2, the selection switch SEL is turned on, and a signal from the pixel appears on the vertical output line VL. In other words, the pixel is selected. At this point, the electric potential corresponding to the electric potential of the FD immediately after the floating diffusion portion FD is reset appears on the signal line VL.

When the signal Pc0r becomes low level in a time t3, the clamp capacity C0 clamps the level generated by resetting of the floating diffusion portion FD. The terminal of the clamp capacity on the side connected to the inverting input terminal of the operational amplifier becomes Vc0r due to a virtual ground of the operational amplifier.

When the signal Ptx becomes high level in a time t4, the charge accumulated on the photodiode PD is transferred to the floating diffusion portion FD, and the electric potential of the vertical output line changes accordingly. Since the level generated by the resetting of the floating diffusion portion FD is clamped by the clamp capacity C0, only the amount of change from the electric potential of the vertical output line VL in the vertical time t3 is input to the inverting input terminal of the operational amplifier. As a result, noise components including components generated by resetting of the floating diffusion portion and components specific to the amplification unit SF can be reduced, and a signal with few noise components are transmitted to the ADC arranged at a stage subsequent to the CDS circuit. The configuration of the CDS circuit illustrated in FIG. 2 is also advantageous in improving the S/N ratio, because a gain determined by the ratio of capacity values of the clamp capacity C0 and the feedback capacity Cf can be applied.

When the signal Pres again becomes high level in a time t5 after the signal Ptx has changed to low level, the power supply Vcc resets the charge accumulated on the floating diffusion.

The power supply Vcc also resets the photodiode PD when the signal Ptx becomes high level in a time t6. The charge according to the incident light starts to accumulate on the photodiode PD when the signal Ptx changes to low level.

The selected state of the pixel is canceled when the signal Psel becomes low level in a time t7. The operation of resetting the photodiode PD in the time t6 may be performed after the signal Psel has changed to low level depending on the applications. For example, the operation can be performed after the signal Psel has changed to low level to shorten the accumulation time of the charge in the photodiode PD. On the other hand, the signal Ptx may not be changed to high level for resetting the photodiode PD to extend the accumulation time.

Figure 2:
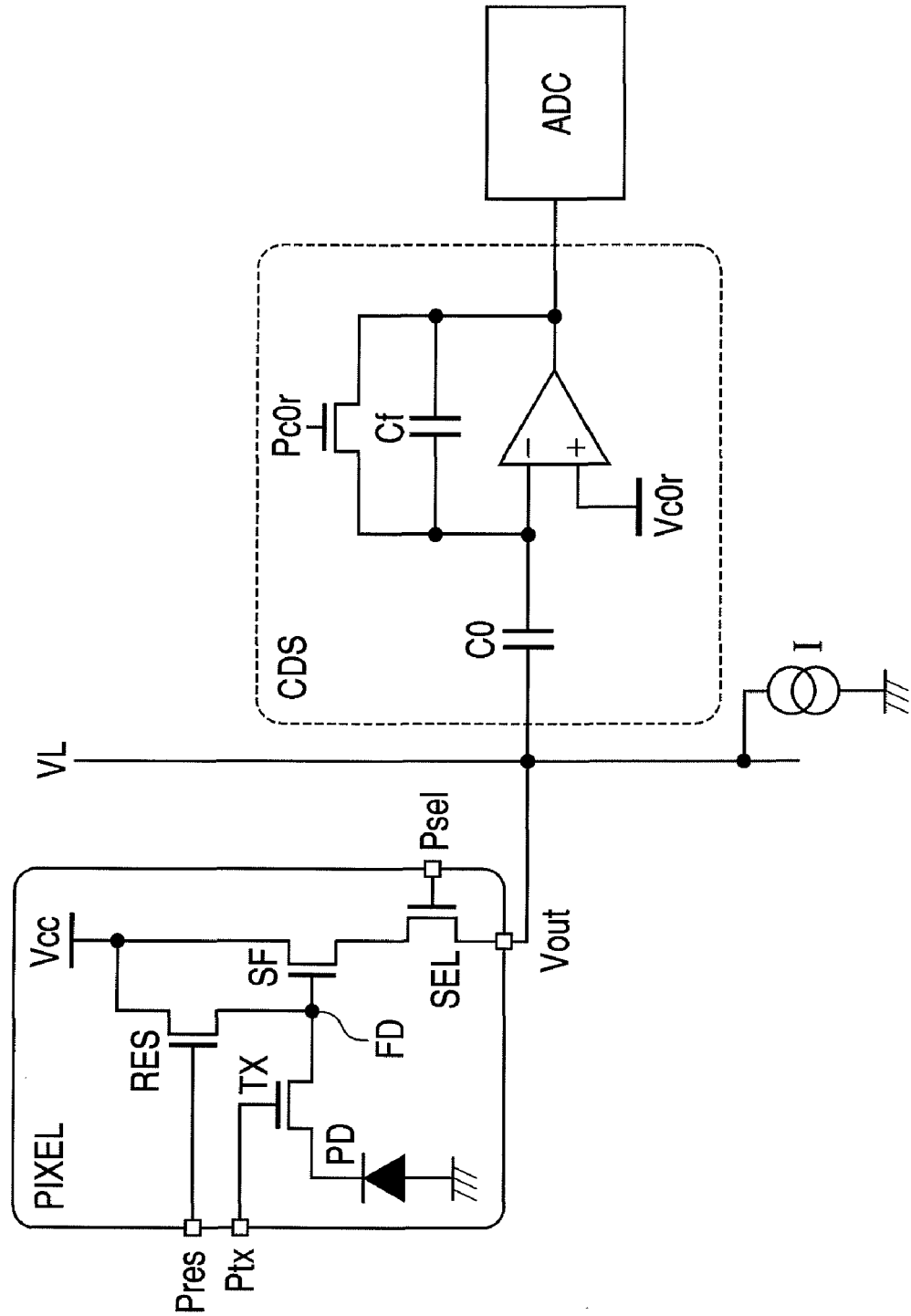
FIG. 2 is an equivalent circuit diagram of a pixel and a CDS circuit according to the embodiments of the present invention.

Signals with reduced noise components are output from the CDS circuit illustrated in FIG. 2 only in the period from the time t4 to the time t5. Therefore, the A/D conversion operation needs to be performed in the period. However, if the ADC includes a sample and hold circuit, the output of the CDS circuit can be held in the period from the time t4 and the time t5. Therefore, the A/D conversion operation can be performed at a time t7 and afterwards.

Figure 4:
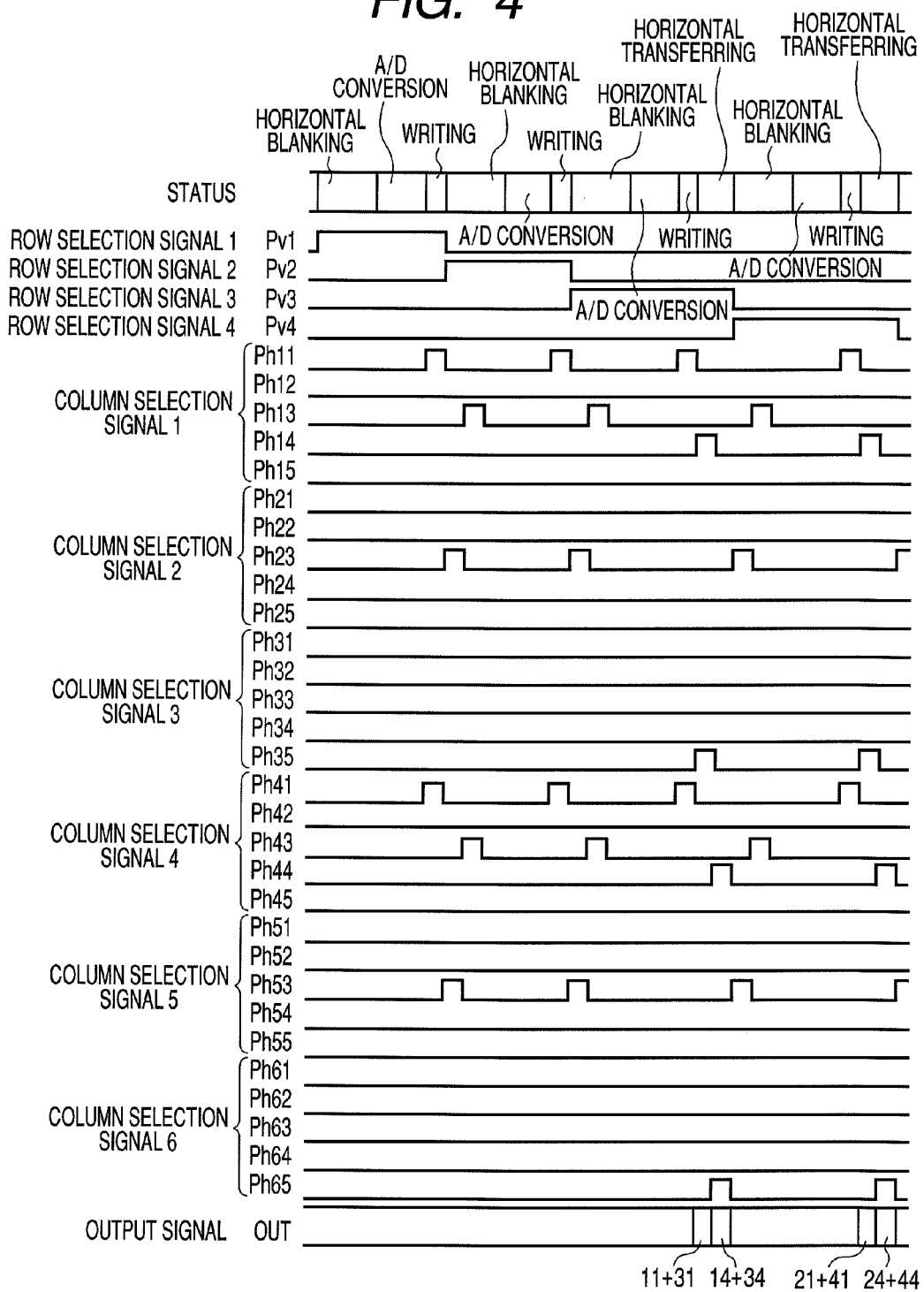
FIG. 4 is a timing chart of a method of driving the solid-state imaging apparatus according to a first embodiment of the present invention.

The timing chart of FIG. 4 illustrates an operation of the solid-state imaging apparatus illustrated in FIG. 1 executing a horizontal skipping operation while adding signals of two pixels in the same column. The operation will be described in accordance with FIG. 4. The data written in the register circuits 1 to 6 is 0 in the initial state.

A pixel column including pixels 11 to 41 will be focused in the description. The row selection signal Pv1 first becomes high, and the operation of a read out period of the first row is started. In the horizontal blanking of the status, the pixel 11 outputs an analog electric signal to the vertical output line 105, and the CDS1 cancels the noise. The ADC1 applies A/D conversion to the noise-cancelled signal in the A/D conversion status and outputs the signal as a digital signal. The ADC1 is connected to the register circuit 1 after a column selection signal Ph11 changes to high level in the writing status, and the digital signal is written into the register circuit 1.

Subsequently, in exchange of the transition of the row selection signal Pv1 to low level, the row selection signal Pv2 becomes high level, and a read out operation of the pixels of the second row is started. In the horizontal blanking status of the second row, a transfer operation from the register circuit 1 to the register circuit 2 is performed simultaneously with the reading of the pixels in the second row. A column selection signal Ph23 first becomes high, and the digital signal (0 in this case) held by the register circuit 2 is transferred to the register circuit 3. A column selection signal Ph13 then becomes high, and the digital signal based on the pixel 11 held by the register circuit 1 is transferred to the register circuit 2.

The analog electric signal from the pixel 21 noise-cancelled by the CDS1 in the horizontal blanking status is converted to a digital signal in the A/D conversion status and is then written into the register circuit 1 with the transition of the column selection signal Ph11 to high in the following writing status. The writing to the register 1 is finished, the row selection signal Pv2 becomes low level, and the operation of the second row is finished.

An operation of the third row is started by the transition of the row selection signal Pv3 to high level, and the digital signal held by the register circuit 2, or the digital signal based on the pixel 11, is transmitted to the register 3 in the horizontal blanking status. After the transition of the column selection signal Ph13 to high level, the digital signal held by the register circuit 1, or the digital signal based on the pixel 21, is transferred to the register 2. Also in the horizontal blanking status of the third row, the analog electric signal from the pixel 31 is read out to the vertical output line 115, and the CDS1 cancels the noise. The ADC1 converts the noise-cancelled analog electric signal to a digital signal in the A/D conversion status and outputs the signal, which is then written into the register circuit 1 in the writing status.

Column selection signals Ph14 and Ph35 simultaneously become high in the following horizontal transferring status, and the signals held by the register circuits 1 and 3, or the digital signals based on the pixels 31 and 11 are output to the horizontal output lines 112 and 113, respectively. The two digital signals input in parallel in the arithmetic operation circuit 109 are added in the arithmetic operation circuit 109 and output through the selector 110. FIG. 4 schematically illustrates the signal output from the selector 110, and for example, 11+31 indicates that an addition of the digital signal based on the pixel 11 and the digital signal based on the pixel 31 is output.

The same operation as in the third row is repeated in the operations of the fourth row and afterwards, and the digital signals based on the pixels of the same column are added every other row and output. The addition of every other row can be used to add signals from pixels of the same color when color filters with 2×2 repetitions, such as a Bayer array, are arranged on the pixel portion.

Three rows on the left among the horizontal six pixels are focused in the above description. The operation of the three rows on the right is performed in the same timing as in the block on the left, except that the timing of outputting the digital signals held by the register circuits 4 and 6 to the horizontal output lines 112 and 113 in the horizontal transfer status is different from that on the left side. Although the addition is described as an example, the arithmetic operation performed by the arithmetic operation circuit 109 may be an averaging process or a difference process.

Figure 5:
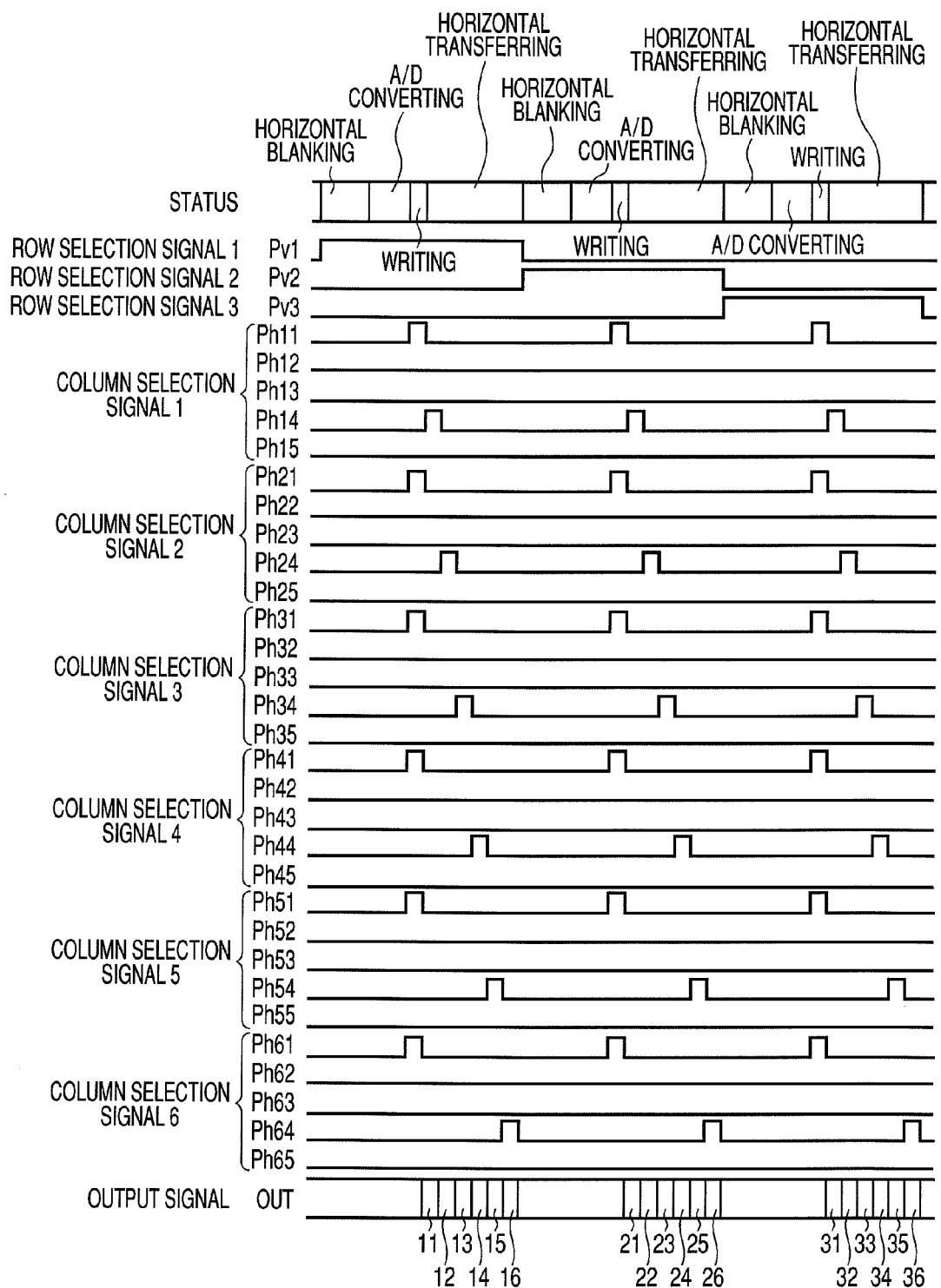
FIG. 5 is a timing chart of the method of driving the solid-state imaging apparatus according to the first embodiment of the present invention.

An operation of outputting without skipping or addition in the method of driving the solid-state imaging apparatus illustrated in FIG. 1 will be described using FIG. 5. The method of driving is performed to attain high resolution in still image shooting and the like.

In the method of driving for reading out the signals from all pixels, a horizontal transfer operation is performed in a read out period of each row. In the horizontal blanking and the A/D conversion status of the first row, the CDS cancels the noise of an analog electric signal from the pixel of the first row, and the ADC outputs the signal as a noise-cancelled digital signal.

The column selection signals Ph11, Ph21, . . . simultaneously become high in the following writing status, and each register circuit holds the digital signal output from the ADC of each column.

The column selection signals Ph14, Ph24, . . . sequentially become high in the following horizontal transfer status, and the digital signals held by the register circuits are sequentially output to the horizontal output line 112. The digital signals output to the horizontal output line 112 are output outside the solid-state imaging apparatus through the selector 110.

The solid-state imaging apparatus illustrated in FIG. 1 can sequentially output the signals of all pixels by performing the same operation for the second and subsequent rows.

In general, the fast output from the solid-state imaging apparatus is necessary in applications in which images need to be obtained at high frame rates, such as moving images. On the other hand, in the method of driving described above, the horizontal blanking period, the A/D conversion period, the writing period, and the horizontal transfer period temporally continue without overlapping each other. Therefore, although the operation in each period can be speeded up to achieve the fast signal output, a plurality of operations can be temporally overlapped in another method.

Figure 6:
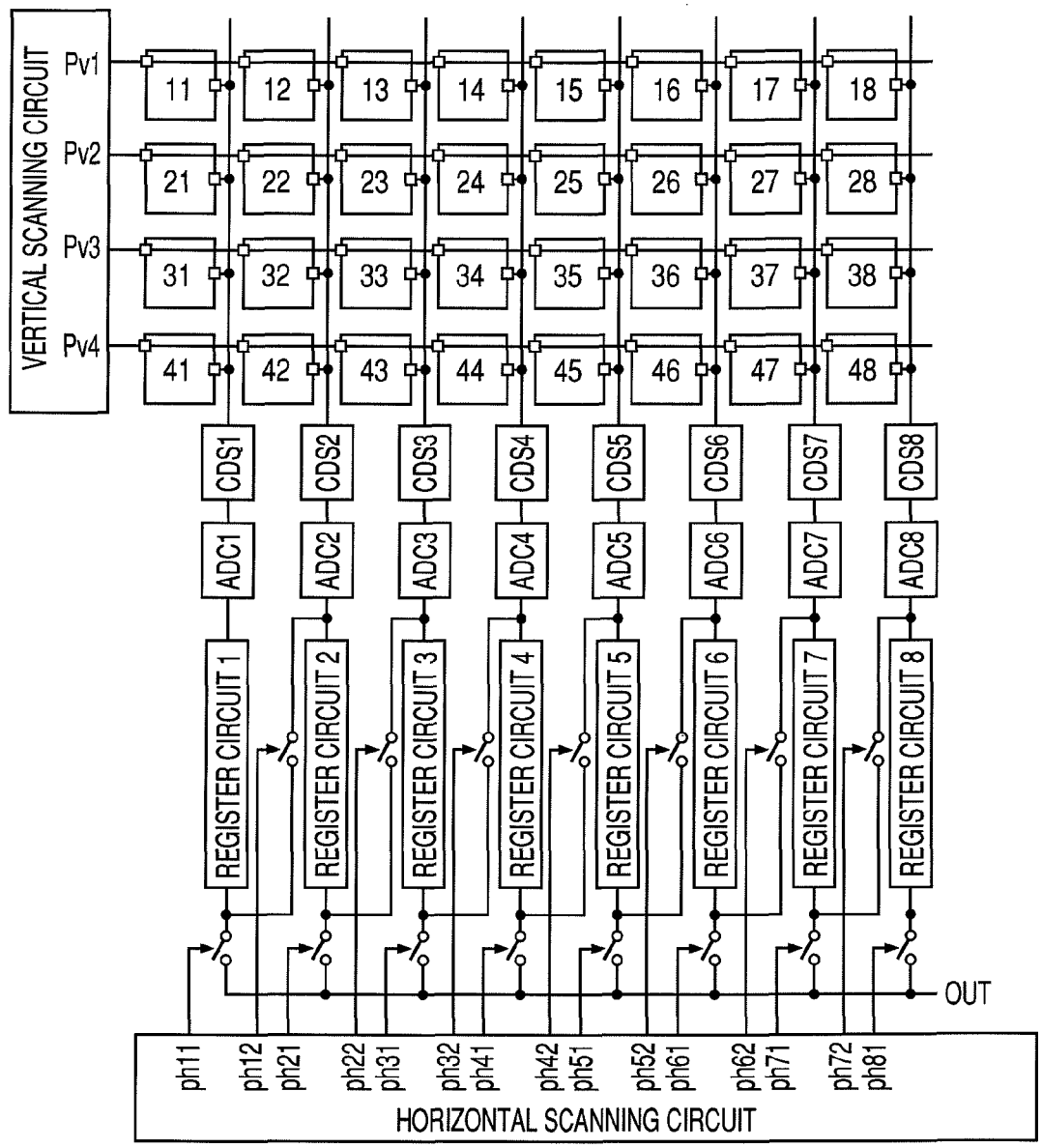
FIG. 6 is a block diagram of the solid-state imaging apparatus according to the first embodiment of the present invention.

FIG. 6 is a block diagram of a schematic configuration of the solid-state imaging apparatus according to the present embodiment. The wiring not involved in the operation described here is omitted from the schematic configuration illustrated in FIG. 1, and the digital signals held by the register circuits are output from OUT through the horizontal output lines. The register circuits that can output signals to two horizontal output lines in the configuration of FIG. 1 are omitted for simplification of the description. The arithmetic operation circuit is also omitted, and the OUT illustrated in FIG. 6 can be considered to be equivalent to the pathway in FIG. 1 for outputting through the selector. The connection is always made between the A/D converters and the register circuits of corresponding columns, which is actively controlled by the signals Pn1 (n is 1 to 6) in FIG. 1, to simplify the description. The same state can be obtained by always maintaining the signal Phn1 at high level in the configuration of FIG. 1. Another difference from the configuration illustrated in FIG. 1 is that the pixels are 4 rows×8 columns. However, the difference is not essential, and the number of pixels can be arbitrarily set.

Figure 7:
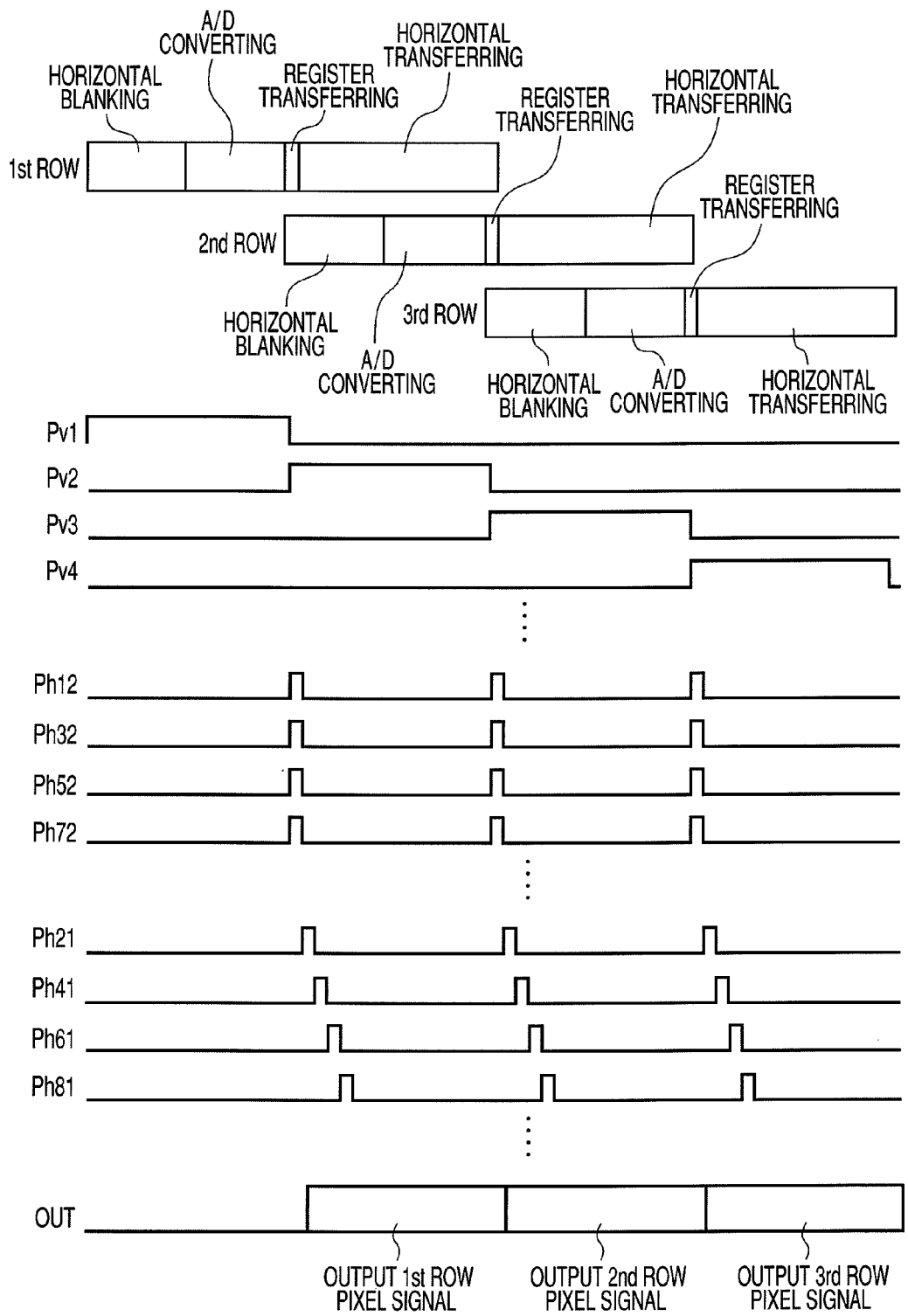
FIG. 7 is a timing chart of an operation of the solid-state imaging apparatus according to the first embodiment of the present invention.

The method of driving the solid-state imaging apparatus according to FIG. 6 will be described using FIG. 7. A horizontal skipping read out operation of every other column will be described, in which signals based on the pixels of even columns are not used.

The signals based on the pixels of the first row are input to the CDS circuits corresponding to the pixels in the horizontal blanking period among the periods that the row selection signal Pv1 becomes high level. The A/D converters corresponding to the CDS circuits convert the analog electric signals processed by the CDS circuits into digital signals in the following A/D conversion period. The writing period illustrated in FIGS. 4 and 5 is omitted in the configuration of FIG. 6, because the A/D converters and the register circuits of the corresponding columns are always connected. The horizontal skipping read out is performed in this case. Therefore, the power consumption can be reduced by shutting down the power supply so that the A/D converters of the even columns are not activated, or by turning off the power supply to set a non-operation state in which the A/D converters do not perform A/D conversion operations. A timing control circuit unit as a control unit may control the power supply.

When the signals Ph12, Ph32, Ph 52, and Ph72 become high level in pulses in the register transfer period, the digital signals held in the register circuits of the odd columns are transferred to the register circuits of the even columns.

Subsequently, when the signals Ph21, Ph41, Ph61, and Ph81 sequentially become high level in the horizontal transfer period, the digital signals based on the pixels of the first row held by the register circuits of the even columns are output from the OUT through the horizontal output line.

The difference from the operation in FIG. 4 is that the operation in the register transfer period and the horizontal transfer period of the pixels in the first row is performed simultaneously with the operation in the horizontal blanking period and the A/D conversion period of the pixels in the second row. Thus, the operation of outputting the digital signals based on the pixels of the first row from the register circuit and the operation of inputting the analog electric signals based on the pixels of the second row to the ADC as well as the operation of A/D conversion are simultaneously performed. The A/D conversion operation is not performed in the horizontal blanking period. Therefore, the digital signals held by the register circuit 1 are not overwritten even if the horizontal blanking period of the pixels of the second row is set simultaneously with the register transfer period and the horizontal transfer period of the pixels of the first row. The A/D conversion operation of the pixels of the second row can be performed in the horizontal transfer period of the pixels in the first row as long as the digital signals held in the register circuit 1 has been transferred to the register circuit 3.

Similarly, part of the operations of the pixels of the second and third rows are performed temporally simultaneously. In the operation illustrated in FIG. 4, there is a period from the output of the digital signals based on the pixels of a certain row to the output of the digital signals based on the pixels of the next row, in which the signals are not output. However, according to the operation illustrated in FIG. 7, the digital signals based on the pixels of a plurality of rows are output without a pause. Therefore, the signals can be obtained faster than in the operation illustrated in FIG. 4, and the operation illustrated in FIG. 7 can be used especially in the applications in which shooting at a high frame rate is required, such as in moving images.

The above described embodiment of the present invention includes a connecting unit that connects an output terminal of a register circuit and an input terminal of a register circuit arranged in a column of pixels that is different from that of the register circuit. Therefore, the number of register circuits not involved in the operation can be reduced and the use efficiency of the circuits can be improved in the horizontal skipping addition operation as compared to the conventional techniques. The connecting unit in the present embodiment denotes a pathway that is turned on when the column selection signal Phn1, Phn2, or Phn3 becomes high in the pixels of an n-th column in FIG. 1 and denotes a pathway that is turned on when the column selection signal Phn2 becomes high level in FIG. 6. The solid-state imaging apparatus illustrated in FIG. 1 can read out the signals of all pixels by the drive illustrated in FIG. 5.

Second Embodiment

Figure 8:
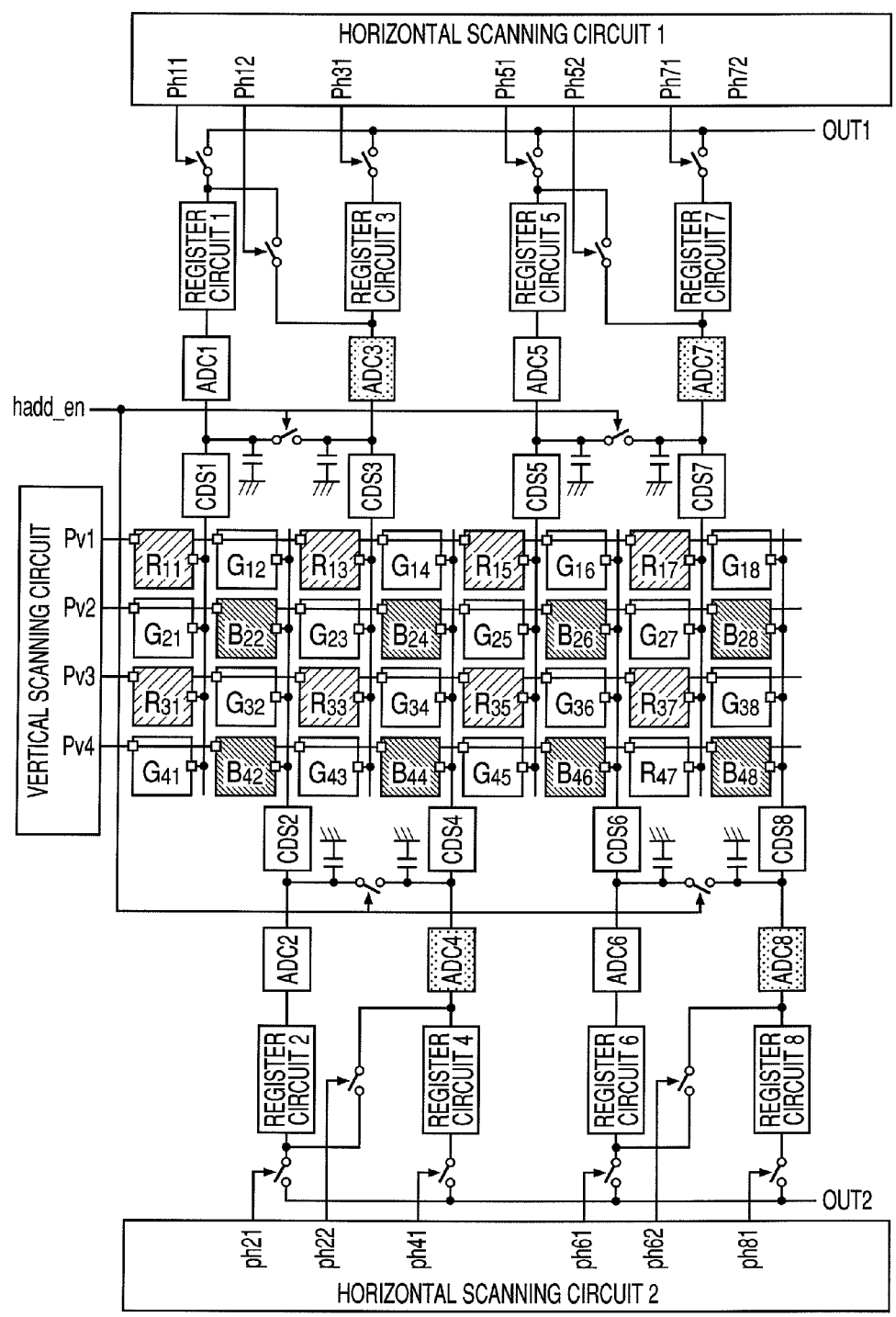
FIG. 8 is a block diagram of the solid-state imaging apparatus according a second embodiment of the present invention.
Figure 9:
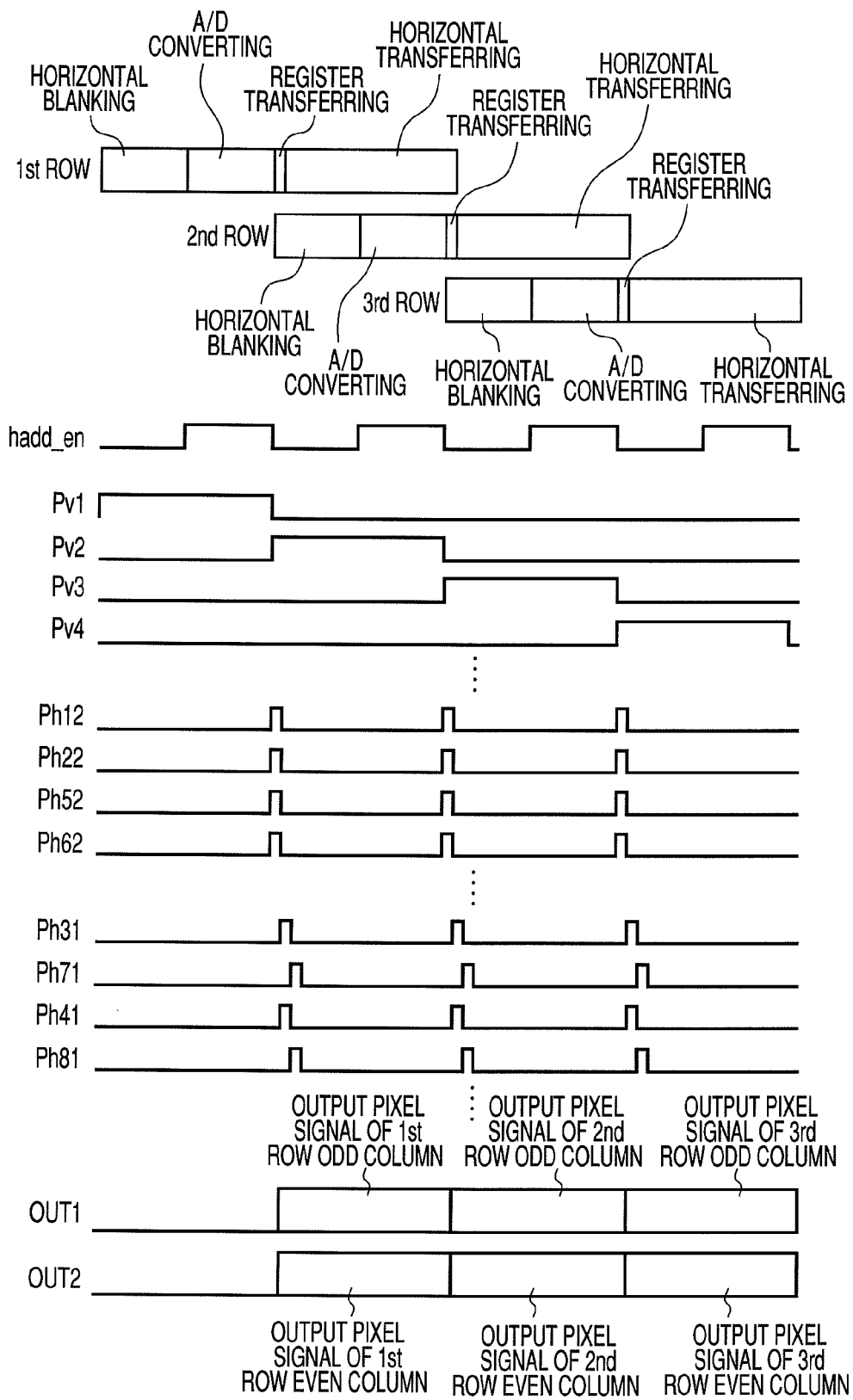
FIG. 9 is a timing chart of an operation of the solid-state imaging apparatus according to the second embodiment of the present invention.

Another embodiment of the present invention will be described using FIGS. 8 and 9. FIG. 8 depicts a configuration example of the solid-state imaging apparatus according to the present embodiment. FIG. 9 is a timing diagram for describing an operation of the configuration in FIG. 8.

Differences from the configuration illustrated in FIG. 1 will be described first. Color filters are arranged on the pixels in the configuration of FIG. 8, and the array is a Bayer array. In FIG. 8, characters R, G, and B denote red, green, and blue color filters respectively, and a pixel arranged with a color filter of C color (C is one of R, G, and B) will be called a C pixel for convenience. Columns of different color patterns alternately align in the color filters of the Bayer array. The signals based on the pixels of the same color pattern can be output from an output pathway in the configuration of FIG. 8. Thus, the signals based on the pixels in the odd columns made of R pixels and G pixels are output from OUT1, and the signals based on the pixels in the even columns made of G pixels and B pixels are output from OUT2. Another difference is that holding capacitors are arranged between the CDS circuits and the ADCs and that switches for connecting the holding capacitors of adjacent columns, the holding capacitors of columns connected to the same output pathways, are arranged.

The operation will be described with reference to FIG. 9. The pixels of the first and third columns will be especially focused in the description to simplify the description.

The pixels of the first row are selected in the period in which the row selection signal Pv1 is high level. The CDS circuit reduces the noise components of the analog electric signals output from the pixels in the horizontal blanking period. The holding capacitor arranged on the corresponding column holds the signals output from the CDS circuit.

When a signal hadd_en becomes high level in the following A/D conversion period, the holding capacitors arranged corresponding to the pixels of the first and third columns are electrically connected. The capacity values of the holding capacitors arranged corresponding to the pixels of the first and third columns are equal. Therefore, when the signal hadd_en becomes high level, an average level of the signals accumulated in the two holding capacitors is held. The ADC1 applies A/D-conversion to the average level, and the conversion result is written into the register circuit 1 as a digital signal.

When the signal Ph12 changes to high level in the register transfer period, the digital signal held by the register circuit 1 is transferred to the register circuit 3. When the signal Ph31 becomes high level in the horizontal transfer period, the digital signal corresponding to the average level of the signals based on the R pixels 11 and 13 held by the register circuit 3 is output from the OUT1.

Subsequently, performing an operation of pixels in arbitrary n and n+1 rows in the same way allows reading out of signals from the solid-state imaging apparatus faster than in the operation illustrated in FIG. 5.

A vertical scanning circuit or a timing control circuit unit described below supplies the signal hadd_en. Although averaging of the signals based on the pixels in the first and third columns has been described as an example in the present embodiment, the signals based on the pixels in the fifth and seventh columns can be further averaged, and the configuration can be arbitrarily set according to the applications. In addition, although the ADC3 is not involved in the operation in the present embodiment, the power consumption can be reduced by shutting down the power supply of the ADCs not involved in the operation, or by turning off the power supply so that the A/D converter is switched to the non-operation state in which the A/D conversion operation is not performed. The timing control circuit unit as a control unit may control the power supply.

Since the horizontal skipping operation is performed in the method of driving described in the first embodiment, information based on the skipped pixels are lost. On the other hand, the information is not lost in the method of driving described in the present embodiment because the signals are averaged. Therefore, higher quality images can be obtained. The connecting unit in the present embodiment denotes a pathway that is turned on when the column selection signal Phn2 becomes high level in FIG. 8.

Third Embodiment

Another embodiment of the present invention will be described.

Figure 10:
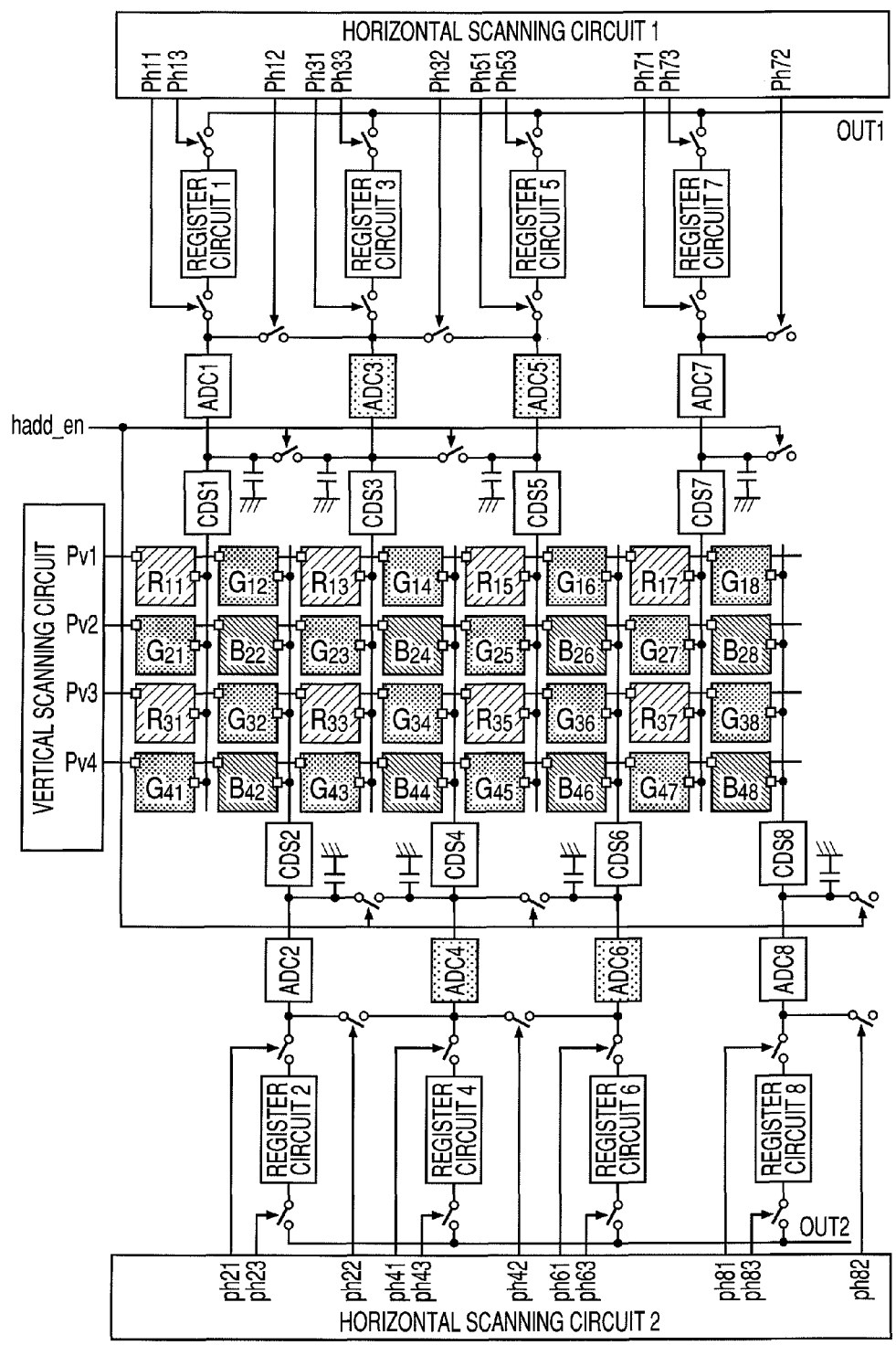
FIG. 10 is a block diagram of the solid-state imaging apparatus according to a third embodiment of the present invention.

FIG. 10 is a block diagram of a schematic configuration of the solid-state imaging apparatus according to the present embodiment. The wiring not involved in the operation described here is omitted from the schematic configuration illustrated in FIG. 1, and the digital signals held by the register circuits are output from the OUT1 and OUT2 through the horizontal output lines.

The difference from the second embodiment is that the digital signal is not transferred from a register circuit to another register circuit, and the ADC writes the digital signal into the register circuit of another column. In the example here, the signals of the pixels of three adjacent columns with the same color pattern are averaged.

The operation in the horizontal blanking period is the same as in the second embodiment, and the description will not be repeated. Focusing on the pixels in the first row, when the signal hadd_en becomes high level in the A/D conversion period, three holding capacitors of the corresponding columns hold the average level of the analog electric signals based on the pixels in the first, third, and fifth columns. The digital signal of the result of the A/D conversion in the ADC1 is written into the register circuit 1 of the same column in the second embodiment. Meanwhile, the digital signal is written into the register circuit 5 by changing the signals Ph12, Ph32, and Ph51 to high level in the A/D conversion period related to the pixels in the first row. Thus, the register circuit arranged corresponding to the pixels of the column different from the A/D converter holds the digital signal.

The ADC1 applies the A/D conversion to the average level of the analog electrical signals based on three pixels in the second row in the A/D conversion period related to the pixels of the second row simultaneously with the operation of the horizontal transfer period related to the pixels in the first row, and the register circuit 2 holds the average level. The ADC1 applies the A/D conversion to the average level of the analog electric signals based on three pixels in the third row in the A/D conversion period related to the pixels in the third row simultaneously with the operation of the horizontal transfer period related to the pixels in the second row, and the register circuit 1 holds the average level.

The register transfer period included in the second embodiment is not required in the present embodiment, and further speeding up is possible.

The power supply of the ADCs not involved in the operation, such as the ADC3 and the ADC5, can be shut down, or the power supply can be turned off so that the AD converter is switched to the non-operation state in which the A/D conversion operation is not performed, thereby reducing the power consumption. The timing control circuit unit as a control unit can control the power supply. The connecting unit in the present embodiment denotes a pathway that is turned on when the column selection signal Phn2 becomes high level in FIG. 10.

Fourth Embodiment

Figure 11:
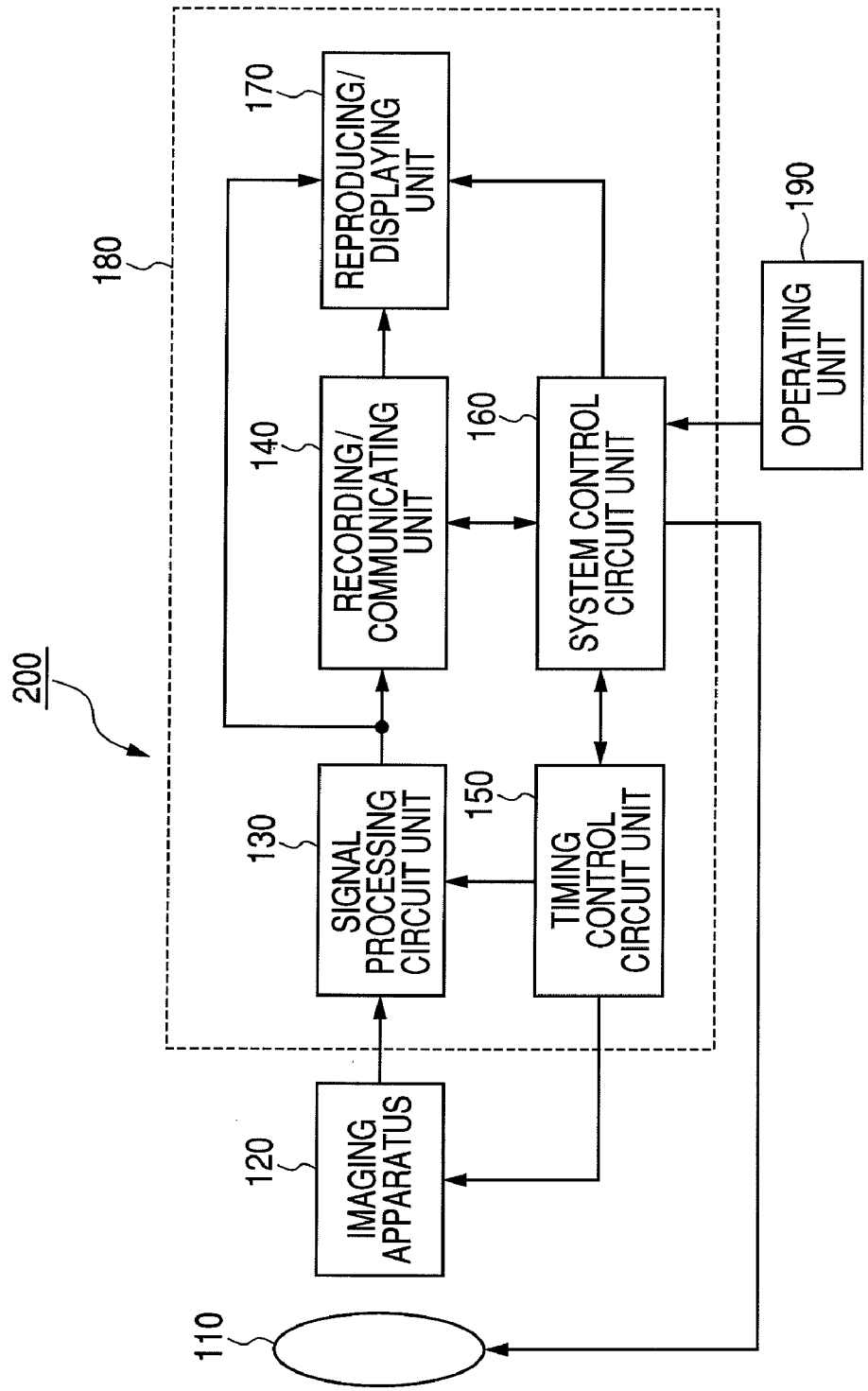
FIG. 11 is a block diagram of an imaging system according to a fourth embodiment of the present invention.

A schematic configuration and a schematic operation of an imaging system 200 according to a fourth embodiment of the present invention will be described using FIG. 11. FIG. 11 is a block diagram of the imaging system 200 according to the present embodiment.

The imaging system 200 includes an optical system 110, a solid-state imaging apparatus 120, and a signal processing unit 180. The signal processing unit 180 includes a signal processing circuit unit 130, a recording/communicating unit 140, a timing control circuit unit 150, a system control circuit unit 160, and a reproducing/displaying unit 170.

The optical system 110 forms an image of an object to a pixel array as an imaging area of the solid-state imaging apparatus 120.

The solid-state imaging apparatus 120 is, for example, the solid-state imaging apparatus of the first embodiment. The solid-state imaging apparatus 120 converts the image of the object formed on the pixel array into an image signal. The solid-state imaging apparatus 120 reads out the image signal from the pixel array and outputs the image signal to the signal processing circuit unit 130.

The signal processing circuit unit 130 applies signal processing, such as a compression process of image data, to the image signal supplied from the solid-state imaging apparatus 120 according to a predetermined method. The signal processing circuit unit 130 supplies the signal-processed image data to the recording/communicating unit 140 and the reproducing/displaying unit 170.

The recording/communicating unit 140 records the image data supplied from the signal processing circuit unit 130 to a recording medium not shown or transmits the image data to an external device not shown. Furthermore, the recording/communicating unit 140 reads out the image data from the recording medium and supplies the image data to the reproducing/displaying unit 170, or receives a predetermined instruction from an input unit not shown and supplies the instruction to the system control circuit unit 160.

The reproducing/displaying unit 170 displays the image data supplied from the signal processing circuit unit 130 or the recording/communicating unit 140 to a display device.

The timing control circuit unit 150 as a control unit supplies a control signal for controlling the timing to drive the solid-state imaging apparatus 120 and serves as a mode switching unit. For example, the timing control circuit unit 150 supplies a signal for performing a horizontal skipping operation or a horizontal addition operation as a first drive mode and supplies a signal for reading out signals from more pixels as a second drive mode.

The system control circuit unit 160 receives information of the predetermined instruction from the recording/communicating unit 140. The system control circuit unit 160 controls the optical system 110, the recording/communicating unit 140, the reproducing/displaying unit 170 and the timing control circuit unit 150 according to the predetermined instruction. For example, the system control circuit unit 160 controls the optical system 110, the recording/communicating unit 140, the reproducing/displaying unit 170 and the timing control circuit unit 150 in an all pixel read out mode or a skipping read out mode, in accordance with the mode.

The operating unit 190 is, for example, a switch operated by the user, and a signal according to the operation of the user is supplied to the system control circuit unit 160. After receiving a signal from the operating unit 190, the system control circuit unit 160 determines with which drive mode the imaging system including the imaging apparatus will be driven according to a program stored in advance. The system control circuit unit 160 then outputs a signal to the timing control circuit unit 150, the recording/communicating unit 140, and the reproducing/displaying unit 170 to perform the operation corresponding to the determined drive mode. After receiving the signal, the timing control circuit unit 150 outputs a control signal to perform the operations described in the above embodiments.

According to the present embodiment, the register circuit arranged in a column of pixels, in which the signals are not read out, can hold the digital signal in the skipping operation. As a result, the number of register circuits not involved in the operation can be reduced in the horizontal skipping operation, and arithmetic operation processes, such as addition, averaging, and subtraction (difference) can be realized while improving the use efficiency of the circuits.

All the embodiments include the arithmetic operation circuit 109 and the selector 110 inside the solid-state imaging apparatus. However, the components need not be arranged inside the solid-state imaging apparatus 120. For example, the components can be arranged in the signal processing circuit unit in FIG. 11. In that case, the area on the semiconductor substrate of the solid-state imaging apparatus 120 can be reduced, and the effects described above can be obtained. An important point in the present invention is that the register circuit arranged on a column of pixels, in which the signals are not read out, can hold the digital signal in the horizontal skipping operation. Another important point in the present invention is that an operation as a first drive mode and an operation as a second drive mode can be performed based on a control signal output from the timing control circuit unit 150. As a result, registers of columns corresponding to the pixels, in which the signals are not read out, can be efficiently used in the first drive mode in applications for acquiring images at a high frame rate, and the mode can be switched to the second drive mode to obtain high-resolution images. Particularly, moving images can be desirably acquired in the first drive mode, and still images can be desirably acquired in the second drive mode. For example, the frame rate of moving images can be improved by performing, as the first mode, the operation in the horizontal blanking period or the A/D conversion period related to the pixels in the first row simultaneously with the operation in the horizontal transfer period related to the pixels in the second row.

The A/D converters in the columns, in which signals are not read out from the pixels, do not involve in the operation. Therefore, the power consumption can be reduced by turning off the power supply to the A/D converters in the columns, in which the signals are not read out, in the horizontal skipping operation. For example, a switch can be arranged between a power supply line for supplying power and the A/D converter, and the switch is turned off when the signals from the pixels in the column are not subjected to the reading. Furthermore, the supply level of the power supply of the column, in which the signals are not read out, can be lowered if the level of the power supply to the A/D converters can be individually set. In other words, it is important to set the power consumption of the A/D converter of the column, in which the signals are not read out, smaller than the power consumption of the A/D converter of the column, in which the signals are read out.

All the embodiments described above illustrate an operation in which the period of the operation for outputting the digital signals based on the pixels of the first row from the register circuit is overlapped with the period for inputting the analog electric signals based on the pixels of the second row into the A/D converter and the period for performing the A/D conversion in the A/D converter. However, only one of the periods, for example, the period of the operation for inputting the analog electric signals based on the pixels of the second row into the A/D converter, may overlap with the period of the operation for outputting the digital signals based on the pixels of the first row from the register circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2008-103556, filed Apr. 11, 2008, which is hereby incorporated by reference herein in its entirety.

What is claimed is:

1. A method of driving a solid-state imaging apparatus comprising that includes (i) a plurality of pixels, arranged in a matrix, each converting an incident light into an analog electric signal and outputting the analog electric signal, (ii) A/D converters arranged corresponding to each column of the plurality of pixels, that convert analog electric signals into a digital signal and output the digital signals from output terminals thereof, (iii) register circuits arranged correspondingly to each column of the pixels, and (iv) a connecting unit configured to selectively either connect the output terminal of one of the A/D converters arranged correspondingly to one of the columns of the pixels to an input terminal of one of the register circuits that is arranged to correspond to the one column of the pixels, or connect the output terminal of the one of the A/D converters to the input terminal of another register circuit that is arranged to correspond to another column of the pixels, the another register circuit arranged corresponding to the another column of the pixels holds the digital signal received by the input terminal of the one of the register circuits thereof from the output terminal of the one of the A/D converters, the method comprising of:
    executing an operation of converting an analog electric signal from a first row of the matrix into a digital signal;
    executing an operation of outputting from one of the register circuits the digital signal based on a pixel in the first row of the matrix; and
    executing an operation of inputting into one of the A/D converters by one of the A/D converters the analog electric signal from a pixel in a second row of the matrix, simultaneously with the output-operation executing step.

2. The method of driving a solid-state imaging apparatus according to claim 1, wherein the solid-state imaging apparatus further comprises an arithmetic operation apparatus that generates an output produced by subjecting, to an arithmetic operation process, the digital signal outputted from each of the output terminals of the plurality of register circuits.

3. The method of driving a solid-state imaging apparatus according to claim 1, wherein the digital signal held by each of the plurality of register circuits is based on the pixels in the same column.

4. The method of driving a solid-state imaging apparatus according to claim 1, wherein the solid-state imaging apparatus further comprises a plurality of holding capacitors each arranged correspondingly to each of the columns of the pixels, and a switch that electrically connects holding capacitors in adjacent columns of the pixels, and
    wherein the method further comprises
converting, by the one of the A/D converters, an analog electric signal held by holding capacitors in adjacent columns of the pixels into one of the digital signals by turning on the switch to connect electrically the holding capacitors in adjacent columns of the pixels.

5. The method of driving a solid-state imaging apparatus according to claim 1, wherein the digital signal held by each of the plurality of register circuits is based on the pixels in the same row.

6. The method of driving a solid-state imaging apparatus according to claim 2, wherein the arithmetic operation process includes at least one of addition, subtraction and averaging.

7. The method of driving a solid-state imaging apparatus according to claim 1, the method further comprising a horizontal skipping read out including transferring one of the digital signals based on a pixel in a column subjected to the reading out to the register circuit arranged correspondingly to a column not subjected to such a reading out operation.

8. A method of driving a solid-state imaging apparatus that includes (i) a plurality of pixels, arranged in a matrix, each converting incident light into an analog electric signal and outputting the analog electric signal, (ii) A/D converters arranged corresponding to each column of the plurality of pixels, that convert analog electric signals into digital signals and output the digital signals from output terminals thereof, (iii) register circuits arranged correspondingly to each column of the pixels, and (iv) a connecting unit configured to selectively either connect the output terminal of one of the A/D converters arranged correspondingly to one of the columns of the pixels to an input terminal of one of the register circuits that is arranged to correspond to the one of the columns of the pixels, or connect an output terminal of the one of the register circuits that is arranged to correspond to the one of the columns of the pixels to the input terminal of another register circuit arranged corresponding to another column of the pixels, the another register circuit arranged corresponding to the another column of the pixels holds the digital signal received by the input terminal thereof from the output terminal of the one of the register circuits arranged corresponding to the one column of the pixels, the method comprising steps of:
    executing an operation of converting an analog electric signal from a first row of the matrix into a digital signal;
    executing an operation of outputting from one of the register circuits the digital signal based on a pixel in the first row of the matrix; and
    executing an operation of inputting into one of the A/D converters or converting by one of the A/D converters the analog electric signal from a pixel in a second row of the matrix, simultaneously with the output-operation executing step.

9. The method of driving a solid-state imaging apparatus according to claim 8, wherein the solid-state imaging apparatus further comprises an arithmetic operation apparatus that generates an output produced by subjecting, to an arithmetic operation process, the digital signal outputted from each of the output terminals of the plurality of register circuits.

10. The method of driving a solid-state imaging apparatus according to claim 8, wherein the digital signal held by each of the plurality of register circuits is based on the pixels in the same column.

11. The method of driving a solid-state imaging apparatus according to claim 8, wherein the solid-state imaging apparatus further comprises a plurality of holding capacitors each arranged correspondingly to each of the columns of the pixels, and a switch that electrically connects holding capacitors in adjacent columns of the pixels, and
    wherein the method further comprises converting, by the one of the A/D converters, an analog electric signal held by holding capacitors in adjacent columns into one of the digital signals by turning on the switch to connect the holding capacitors in adjacent columns.

12. The method of driving a solid-state imaging apparatus according to claim 8, wherein the digital signal held by each of the plurality of register circuits is based on the pixels in the same row.

13. The method of driving a solid-state imaging apparatus according to claim 9, wherein the arithmetic operation process includes at least one of addition, subtraction and averaging.

* * * * *